US012687283B2

(12) United States Patent
Bai et al.

(10) Patent No.: US 12,687,283 B2
(45) Date of Patent: Jul. 21, 2026

(54) ANGLE-ADJUSTABLE LAMP

(71) Applicant: NINGBO JINGHUI OPTO-ELECTRONIC CO., LTD., Ningbo (CN)

(72) Inventors: Guohui Bai, Ningbo (CN); Xia Xiao, Ningbo (CN)

(73) Assignee: NINGBO JINGHUI OPTO-ELECTRONIC CO., LTD., Ningbo (CN)

( * ) Notice: Subject to any disclaimer, the term of this patent is extended or adjusted under 35 U.S.C. 154(b) by 170 days.

(21) Appl. No.: 18/440,968

(22) Filed: Feb. 14, 2024

(65) Prior Publication Data

US 2025/0198607 A1 Jun. 19, 2025

(30) Foreign Application Priority Data

Dec. 15, 2023 (CN) ......................... 202323430276.7

(51) Int. Cl.

*F21V 21/30* (2006.01)
*F21S 8/02* (2006.01)
*F21V 14/02* (2006.01)
*F21V 21/04* (2006.01)
*F21V 23/00* (2015.01)

(52) U.S. Cl.

CPC .............. *F21V 21/30* (2013.01); *F21V 14/02* (2013.01); *F21V 21/049* (2013.01); *F21S 8/026* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/047* (2013.01); *F21V 23/001* (2013.01); *F21V 23/002* (2013.01)

(58) Field of Classification Search

CPC ............. F21V 21/30; F21V 21/04–049; F21V 23/001; F21V 23/002; F21S 8/026
See application file for complete search history.

(56) References Cited

U.S. PATENT DOCUMENTS 11,525,557 B2 * 12/2022 Hou ...................... F21V 17/002
2022/0282855 A1 * 9/2022 Chen ....................... F21V 21/04

FOREIGN PATENT DOCUMENTS

WO WO-2013100308 A1 * 7/2013 .............. F21S 8/026
WO WO-2016007018 A1 * 1/2016 ............ F21V 21/046

OTHER PUBLICATIONS

Machine translation of WO 2013100308 A1 retrieved from the FIT database of PE2E search. (Year: 2025).*

* cited by examiner

*Primary Examiner* — Colin J Cattanach
(74) *Attorney, Agent, or Firm* — Maschoff Brennan

(57) ABSTRACT

An angle-adjustable lamp is provided, including a base shell and a lamp body. The base shell is provided with an accommodating cavity. The lamp body is rotatably mounted in the accommodating cavity and is in a damping fit with the accommodating cavity. The lamp body includes a lamp body main body and a rotating shaft having one end connected with the lamp body main body. The lamp body main body has a light exit surface for emitting light. An axis of the rotating shaft is not perpendicular to the light exit surface. An end of the rotating shaft away from the lamp body main body runs through the base shell and extends to an outside of the base shell. According to the present disclosure, the lamp body is rotatably mounted in the accommodating cavity, so that a light exit angle of the lamp body is adjustable.

10 Claims, 5 Drawing Sheets

ANGLE-ADJUSTABLE LAMP

TECHNICAL FIELD

The present disclosure relates to the field of lighting equipment, and in particular to an angle-adjustable lamp.

BACKGROUND

Lamps are essential appliances in people's lives. They can provide light for people in a dim environment.

However, it is usually impossible or troublesome to adjust the light exit angle of the existing lamps. The angle of the angle-adjustable lamp in the market is usually adjusted by loosening or tightening screw. After loosening the screws, the angle can be adjusted, and the adjusted angle can be maintained by tightening the screws. The adjustment is troublesome, and may need additional auxiliary tools.

SUMMARY

In order to overcome the defects, the present disclosure provides an angle-adjustable lamp. A lamp body is rotatably mounted in an accommodating cavity, so that a light exit angle of the lamp body is adjustable. Moreover, the lamp body is in a damping fit with the accommodating cavity, so that the lamp body can stay and remain in any position to which it moves. Therefore, the angle-adjustable lamp is more convenient to adjust.

In order to achieve the above purpose, the present disclosure adopts the following technical solution:

An angle-adjustable lamp includes a base shell and a lamp body. The base shell is provided with an accommodating cavity for accommodating the lamp body. The lamp body is rotatably mounted in the accommodating cavity and is in a damping fit with the accommodating cavity. The lamp body includes a lamp body main body and a rotating shaft having one end connected with the lamp body main body. The lamp body main body has a light exit surface for emitting light. An axis of the rotating shaft is not perpendicular to the light exit surface. An end of the rotating shaft away from the lamp body main body runs through the base shell and extends to an outside of the base shell. Specifically, when in use, the lamp body is always in a damping fit with the accommodating cavity.

"An axis of the rotating shaft is not perpendicular to the light exit surface" can be understood as: the axis of the rotating shaft is parallel to the light exit surface, or the axis of the rotating shaft is arranged at an angle with the light exit surface and the angle is smaller than 90 degrees.

With the above structure, the user may rotate the rotating shaft relative to the base shell so as to drive the lamp body main body to rotate around the axis of the rotating shaft therewith. Moreover, since the axis of the rotating shaft is not perpendicular to the light exit surface, the light exit angle of the light exit surface can be adjusted when the light exit surface rotates around the axis of the rotating shaft.

Moreover, the lamp body is in a damping fit with the accommodating cavity, so that the lamp body can stay and remain in any position to which it moves. That is, after operating the rotating shaft to adjust the light exit angle of the light exit surface to a proper position, the user may stop operating the rotating shaft. Then, the lamp body, which is in a damping fit with the accommodating cavity, can stay in this position, so that the light exit surface can stay at this light exit angle. In addition, due to the damping fit between the lamp body and the accommodating cavity, the user needs to overcome the damping force when operating the rotating shaft, which increases the operating feel of the user.

With the above structure, the light exit angle of the light exit surface can be adjusted within a wide range. Moreover, the structure is simple and convenient to operate.

Further, the lamp body main body includes a rotating portion having a convex spherical curved surface, and correspondingly, an inner wall of the accommodating cavity has a concave spherical curved surface. The rotating portion of the lamp body main body is rotatably arranged in the accommodating cavity. The axis of the rotating shaft or an extension line thereof passes through a center of sphere of the convex spherical curved surface.

With the above structure, the convex spherical curved surface of the rotating portion is fitted with the concave spherical curved surface of the inner wall of the accommodating cavity, so that the lamp body main body can be better rotatably arranged in the accommodating cavity. The axis of the rotating shaft or the extension line thereof passes through the center of sphere of the convex spherical curved surface, so that when the rotation of the rotating shaft drives the rotating portion to rotate, the rotating portion will not deviate in the radial direction, that is, the distance between the convex spherical curved surface of the rotating portion and the concave spherical curved surface of the inner wall of the accommodating cavity will not change. The above structure is reasonable, is reliable and stable in operation, and ensures a wide adjustment range of the light exit angle of the light exit surface.

Further, the angle-adjustable lamp includes a damping member arranged between the inner wall of the accommodating cavity and an outer wall of the lamp body main body. A side of the damping member facing the outer wall of the lamp body main body abuts against the outer wall of the lamp body main body, and a side facing the inner wall of the accommodating cavity abuts against the inner wall of the accommodating cavity.

With the above structure, the arrangement of the damping member realizes the damping fit between the lamp body main body and the accommodating cavity.

Further, the damping member is arranged near the rotating shaft.

With the above structure, when the rotating shaft drives the lamp body main body to rotate, the damping member can always abut against the lamp body main body and the inner wall of the accommodating cavity, thereby ensuring the reliable damping fit between the lamp body main body and the inner wall of the accommodating cavity.

Further, a first damping positioning groove for accommodating and positioning the damping member is concavely provided near a joint of the lamp body main body and the rotating shaft. Correspondingly, the accommodating cavity is concavely provided with a second damping positioning groove for accommodating and positioning the damping member near a rotating shaft hole provided in the base shell that allows the rotating shaft to pass through.

With the above structure, the first damping positioning groove and the second damping positioning groove not only performs a positioning function during mounting, but also can prevent the damping member from deviating from the lamp body main body when the lamp body main body rotates relative to the accommodating cavity during use, so that the damping member can always abut against the lamp body main body and the inner wall of the accommodating cavity, thereby ensuring the reliable damping fit between the lamp body main body and the inner wall of the accommodating cavity.

Further, the damping member is annular, and has an inner diameter greater than or equal to a diameter of the rotating shaft. The damping member is sleeved outside the rotating shaft.

With the above structure, the structure of the damping member is more reasonable, thereby ensuring the reliable damping fit between the lamp body main body and the inner wall of the accommodating cavity.

Further, the outer wall of the lamp body main body is concavely provided with a first damping positioning groove for accommodating and positioning the damping member, and the first damping positioning groove is annular to be matched with the damping member and is arranged around the rotating shaft. Correspondingly, the inner wall of the accommodating cavity is concavely provided with a second damping positioning groove for accommodating and positioning the damping member, and the second damping positioning groove is annular to be matched with the damping member and is arranged around a rotating shaft hole in the base shell that allows the rotating shaft to pass through.

With the above structure, the first damping positioning groove and the second damping positioning groove can adapt to the annular damping member, which makes the above structure more reasonable.

Further, a side wall of the first damping positioning groove extends outward to form an extending groove wall portion.

The first positioning groove is provided in the outer side wall of the lamp body main body, specifically, in the outer wall of the lamp body housing in the lamp body main body, and the lamp body housing is generally not very thick. With the above structure, the extending groove wall portion arranged can increase the depth of the first damping positioning groove, so that the first damping positioning groove can better position, accommodate and limit the damping member.

Moreover, due to the arrangement of the extending groove wall portion, a certain gap is formed between the lamp body main body and the inner wall of the accommodating cavity, which can avoid excessive friction between the lamp body main body and the inner wall of the accommodating cavity during rotation, and thus avoid causing damage to the lamp body main body and the inner wall of the accommodating cavity. The above structure is reasonable in arrangement and can prolong the service life of the angle-adjustable lamp.

Further, the inner wall of the accommodating cavity is convexly provided with a stabilizing block, and the stabilizing block is in a contact fit or a clearance fit with the outer wall of the lamp body main body.

Due to the gap between the lamp body main body and the inner wall of the accommodating cavity, the lamp body main body may shake when rotating. With the above structure, the stabilizing block arranged can limit the lamp body main body to some extent, which can avoid shaking or reduce the degree of shaking when the lamp body main body rotates, so as to stabilize the rotation of the lamp body main body.

Further, along a longitude line of the inner wall of the accommodating cavity and in a direction facing an opening of the accommodating cavity, the stabilizing block is arranged gradually close to the outer wall of the lamp body main body, and an end of the stabilizing block facing the opening of the accommodating cavity is in a contact fit or a clearance fit with the outer wall of the lamp body main body.

With the above structure, the structure of the stabilizing block is more reasonable and reliable in arrangement, and can minimize the influence on the rotation of the lamp body main body.

Further, multiple stabilizing blocks are provided, and the multiple stabilizing blocks are located on a same latitude line on the inner wall of the accommodating cavity and equally divide the inner wall of the accommodating cavity along a circumferential direction.

With the above structure, the stabilizing block is more reasonable in arrangement, and the multiple stabilizing blocks arranged can better stabilize the rotation of the lamp body main body. Specifically, two stabilizing blocks are arranged, and the two stabilizing blocks are symmetrically arranged on two sides of the inner wall of the accommodating cavity.

Further, the rotating shaft includes a rotating shaft body and a rotating shaft cover. One end of the rotating shaft body is connected with the lamp body main body, and an other end runs through the accommodating cavity and extends to the outside of the base shell. The rotating shaft cover is arranged on an end of the rotating shaft extending to an outer wall of the base shell, and an outer diameter of the rotating shaft cover is greater than a diameter of the rotating shaft hole in the accommodating cavity that allows the rotating shaft to pass through.

With the above structure, the structure of the rotating shaft is more reasonable and convenient to mount. Specifically, the end of the rotating shaft body away from the lamp body main body extends from the inside of the accommodating cavity to the outside of the base shell through the rotating shaft hole provided in the base shell that allows the rotating shaft to pass through, and then is connected with the rotating shaft cover. Since the outer diameter of the rotating shaft cover is greater than the diameter of the rotating shaft hole, with the limit of the rotating shaft cover and the lamp body main body, the movement of the rotating shaft body in the axial direction is limited, thereby realizing mounting.

Further, the outer wall of the base shell is convexly provided with an abutting portion outside the rotating shaft hole in the base shell that allows the rotating shaft to pass through, and a side of the rotating shaft cover facing the outer wall of the base shell is in a contact fit with a side of the abutting portion of the base shell facing the rotating shaft cover.

With the above structure, the structure of the angle-adjustable lamp is more reasonable. Moreover, since the side of the abutting portion facing the rotating shaft cover is a flat surface, the rotating shaft can rotate more stably.

Further, the side of the rotating shaft cover facing the base shell is convexly provided with a guide block, and the guide block is arranged at a distance from an axis of the rotating shaft cover. A side of the base shell facing the rotating shaft cover is provided with a guide groove matched with the guide block, and the guide groove is matched with a moving track of the guide block.

The rotation of the rotating shaft cover can drive the rotating shaft body to rotate, thereby driving the lamp body main body to rotate. Therefore, with the above structure, the guide block is fitted with the guide groove, so that the rotating shaft cover can rotate more stably and reliably, and the rotating shaft body and the lamp body main body can also rotate more stably and reliably. Specifically, the guide groove is arranged in the abutting portion.

Further, a limit block configured to abut against a side surface of the guide block is arranged in the guide groove, and in a case that the guide block moves forward along the guide groove to abut against the limit block or the guide block moves backward along the guide groove to abut against the limit block, the light exit surface of the lamp body main body is parallel to a plane where the opening of the accommodating cavity is located.

With the above structure, the limit block limits the movement of the guide block in the guide groove, so that the forward and backward movement range of the guide block is limited, that is, the rotation angle of the rotating shaft is limited, thereby limiting the rotation angle of the lamp body main body.

In the case that the guide block moves forward along the guide groove to abut against the limit block or the guide block moves backward along the guide groove to abut against the limit block, the light exit surface of the lamp body main body is parallel to the plane where the opening of the accommodating cavity is located, so that the user can adjust the light exit surface of the lamp body main body to be parallel to the opening of the accommodating cavity more conveniently, which facilitates the user.

Further, the lamp body main body includes a lamp body housing, a lamp body housing cover and a light source assembly. The lamp body housing and the lamp body housing cover are combined to form a light source mounting cavity for accommodating and mounting the light source assembly. The rotating shaft body is connected with the lamp body housing, and the rotating shaft body and the lamp body housing are an integrated piece.

With the above structure, the rotating shaft body and the lamp body housing are an integrated piece, so that the structure of the rotating shaft body and the lamp body housing is more reasonable in arrangement, which facilitates production and reduces mounting steps. Moreover, the above structure can effectively prevent the relative rotation between the rotating shaft body and the lamp body housing, thereby ensuring the rotating shaft body to drive the lamp body housing to rotate synchronously.

Further, a peripheral side wall of the rotating shaft body is a cylindrical side wall.

Since the rotating shaft body and the lamp body housing are an integrated piece, the peripheral side wall of the rotating shaft body can be a cylindrical side wall, that is, the periphery of the cross section of the rotating shaft body is circular. With the above structure, the rotating shaft body can be better fitted with the rotating shaft hole in the base shell that allows the rotating shaft to pass through, so that the rotating shaft body can rotate more stably, that is, the lamp body main body can rotate more stably.

Further, the rotating shaft body and the rotating shaft cover are fixedly connected through a fastener.

With the above structure, the rotating shaft body can be fixedly connected with the rotating shaft cover. Specifically, the fastener is a screw.

Further, the rotating shaft body is provided with a fastening hole in a fastening fit with the fastener. The fastening hole extends along an axis of the rotating shaft body, and a side wall on an end of the fastening hole away from the lamp body main body protrudes to form an insertion protrusion. Correspondingly, a side of the rotating shaft cover facing the rotating shaft body is provided with an insertion fit post, and the insertion fit post is concavely provided with an insertion groove insertable by the insertion protrusion. A bottom surface of the insertion groove is provided with a fastening through hole running through the rotating shaft cover so as to allow the fastener to pass through.

With the above structure, the insertion protrusion is fitted with the insertion groove, so that the rotating shaft cover can be positioned and mounted on the rotating shaft body conveniently. The fastener passes through the fastening through hole and is in a fastening fit with the fastening hole. Specifically, the fastener is a screw, and the fastener and the fastening hole are in a threaded fastening fit.

The side of the rotating shaft cover facing the base shell is recessed inward to form a rotating shaft cover groove, and the insertion fit post is arranged on a bottom surface of the rotating shaft cover groove.

Further, multiple fastening holes that are arranged around the axis of the rotating shaft body are provided. Correspondingly, the rotating shaft cover is provided with a same number of the insertion fit posts as the fastening holes that are arranged in one-to-one correspondence to the fastening holes.

With the above structure, the rotating shaft cover and the rotating shaft body can be connected more stably and reliably.

Further, the lamp body main body includes a lamp body housing, a lamp body housing cover and a light source assembly. The lamp body housing and the lamp body housing cover are combined to form a light source mounting cavity for accommodating and mounting the light source assembly. The lamp body housing cover is provided with a light exit opening. The light source assembly has the light exit surface, and the light exit surface faces the light exit opening.

With the above structure, the structure of the lamp body main body is more reasonable, and facilitates the assembly of the lamp body main body.

Further, the rotating shaft is provided with a wiring through hole running through the rotating shaft along the axis.

With the above structure, wires can enter the light source mounting cavity through the wiring through hole and be connected with the light source assembly. Moreover, the wiring through hole is provided in a reasonable position, which can prevent the wires from intertwining and ensure a stable and reliable connection between the wires and the light source assembly when the lamp body main body rotates.

Further, the light source assembly includes a light source body, a reflective cup and a diffusing plate. A light emitting side of the light source body faces the light exit opening. The reflective cup has a light entrance port and a light exit port, and an inner wall of the reflective cup connected between the light entrance port and the light exit port forms a reflective surface. The light entrance port of the reflective cup faces the light emitting side of the light source body, and the light exit port faces the light exit opening. The diffusing plate is arranged between the light exit port of the reflective cup and the light exit opening to form the light exit surface.

With the above structure, the structure of the light source assembly is more reasonable in arrangement. Light is emitted by the light source body and enters the reflective cup through the light entrance port of the reflective cup. Since the reflective surface is arranged on the inner wall of the reflective cup, light can be more intensive and exit from the side of the light exit port of the reflective cup. The diffusing plate arranged at the light exit opening can convert a point or line light source into a soft and uniform surface light source.

Specifically, the light source body is a lamp board provided with multiple LED light beads.

Further, the light source assembly further includes a heat dissipation assembly configured to dissipate heat for the light source body.

With the above structure, the heat dissipation assembly can dissipate heat for the light source body, thereby ensuring the light source body to operate stably and reliably.

Specifically, the heat dissipation assembly is a heat dissipation structure based on heat conduction by metals, that is, the heat is dissipated passively. With the above structure, the heat dissipation assembly has no noise generated during the heat dissipation process, and is reasonable in design.

Further, two sides of the base shell are provided with torsion spring clips configured to fix the angle-adjustable lamp. Correspondingly, the base shell is provided with clip seats configured to mount the torsion spring clips.

With the above structure, due to the arrangement of the torsion spring clips, the angle-adjustable lamp can be mounted and fixed more quickly and conveniently.

Further, the torsion spring clip includes a torsion spring arranged on the base shell and a clip sleeve sleeved over the torsion spring. Specifically, the torsion spring is arranged on the clip seat.

With the above structure, due to the arrangement of the clip sleeves, forces can be better applied to the torsion spring clips, thereby ensuring the angle-adjustable lamp to be mounted and fixed stably and reliably.

Compared with the related art, the present disclosure has the following beneficial effects:

(1) According to the angle-adjustable lamp of the present disclosure, the lamp body is rotatably mounted in the accommodating cavity, so that the light exit angle of the lamp body is adjustable. Moreover, the lamp body is in a damping fit with the accommodating cavity, so that the lamp body can stay and remain in any position to which it moves. Therefore, the angle-adjustable lamp is more convenient to adjust.

(2) According to the angle-adjustable lamp of the present disclosure, the lamp body main body includes the rotating portion having the convex spherical curved surface, and the inner wall of the accommodating cavity has the concave spherical curved surface, so that the lamp body main body has a wider adjustment range to meet the demands of the user.

(3) According to the angle-adjustable lamp of the present disclosure, the rotating shaft body and the lamp body housing are an integrated piece, so that the structure of the rotating shaft body and the lamp body housing is more reasonable in arrangement, which facilitates production and reduces mounting steps. Moreover, the above structure can effectively prevent the relative rotation between the rotating shaft body and the lamp body housing, thereby ensuring the rotating shaft body to drive the lamp body housing to rotate synchronously. Moreover, the rotating shaft body can be better fitted with the rotating shaft hole in the base shell that allows the rotating shaft to pass through.

BRIEF DESCRIPTION OF FIGURES

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

Figure 1:
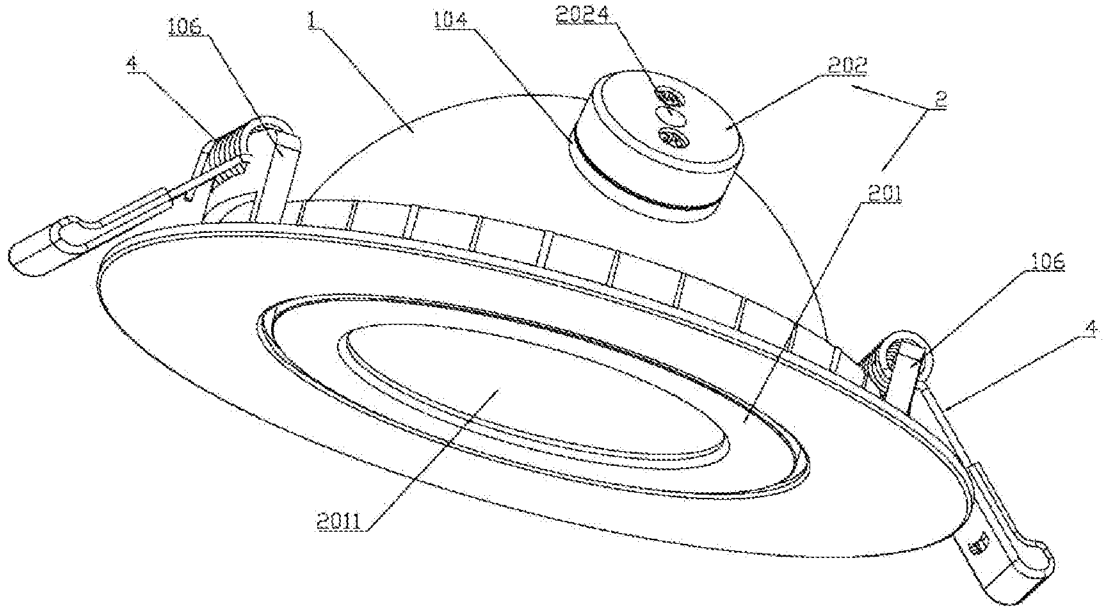
FIG. 1 is a schematic three-dimensional structural view of an angle-adjustable lamp of the present disclosure.

Component names corresponding to reference numerals in the figures: 1, base shell; 101, accommodating cavity; 1011, concave spherical curved surface; 1012, second damping positioning groove; 102, rotating shaft hole; 103, stabilizing block; 104, abutting portion; 105, guide groove; 106, clip seat; 2, lamp body; 201, lamp body main body; 2011, light exit surface; 2012, rotating portion; 2012*a*, convex spherical curved surface; 2013, first damping positioning groove; 2013*a*, extending groove wall portion; 2014, lamp body housing; 2015, lamp body housing cover; 2015*a*, light exit opening; 2016, light source assembly; 2016*a*, light source body; 2016*b*, reflective cup; 2016*b*1, light entrance port; 2016*b*2, light exit port; 2016*b*3, reflective surface; 2016*c*, diffusing plate; 2016*d*, heat dissipation assembly; 2017, light source mounting cavity; 202, rotating shaft; 2021, rotating shaft body; 2021*a*, fastening hole; 2021*b*, insertion protrusion; 2022, rotating shaft cover; 2022*a*, guide block; 2022*b*, insertion fit post; 2022*b*1, insertion groove; 2022*b*2, fastening through hole; 2023, fastener; 2024, wiring through hole; 3, damping member; 4, torsion spring clip; 401, torsion spring; and 402, clip sleeve.

DETAILED DESCRIPTION

This application will be described in detail below in conjunction with accompanying drawings and specific embodiments.

The embodiments of this application are described below through specific examples. Those skilled in the art can easily understand the other advantages and effects of this application from the content disclosed in the specification. It is apparent that the described embodiments are only a part, rather than all of the embodiments of this application. This application may also be implemented or applied through other different specific implementations, and various details in the specification may also be modified or changed based on different viewpoints and applications without departing from the spirit of this application. It should be noted that the embodiments in the following and the features in the embodiments can be combined with each other in case of no conflict. All other embodiments obtained by those of ordinary skill in the art based on the embodiments of this application without creative work are within the protection scope of this application.

It is noted that various aspects of the embodiments within the scope of the appended claims are described below. It is apparent that the aspects described herein can be embodied in a wide variety of forms, and any specific structure and/or function described herein is merely illustrative. Based on this application, those skilled in the art should understand that one aspect described herein may be implemented independently of any other aspect, and two or more of these aspects may be combined in various ways. For example, equipment and/or methods may be implemented using any number of aspects described herein. In addition, the equipment and/or the method may be implemented using other structures and/or functionalities than one or more of the aspects described herein.

It should also be noted that the drawings provided in the following embodiments only schematically illustrate the basic concept of this application, and the drawings show only the components related to this application instead of being drawn according to the quantity, shape and size of the components in actual implementation. In actual implementation, the shape, quantity and proportion of the components may be changed at will, and the layout of components may be more complicated.

In addition, in the following description, specific details are provided to facilitate a thorough understanding of the examples. However, it will be understood by those skilled in the art that the present disclosure may be implemented without these specific details.

In the description of the present disclosure, it should also be noted that, unless otherwise clearly specified and defined, the terms “mount”, “connect” and “link” should be understood in a broad sense. For example, it may be a fixed connection, a detachable connection or an integral connection; or may be a mechanical connection or an electrical connection; or may be a direct link or an indirect link through an intermediate medium, or may be an internal communication between two elements. For those of ordinary skill in the art, the specific meaning of the above terms in the present disclosure can be understood in specific cases.

The technical solution provided by the embodiments of this application will be described with reference to the accompanying drawings.

Figure 2:
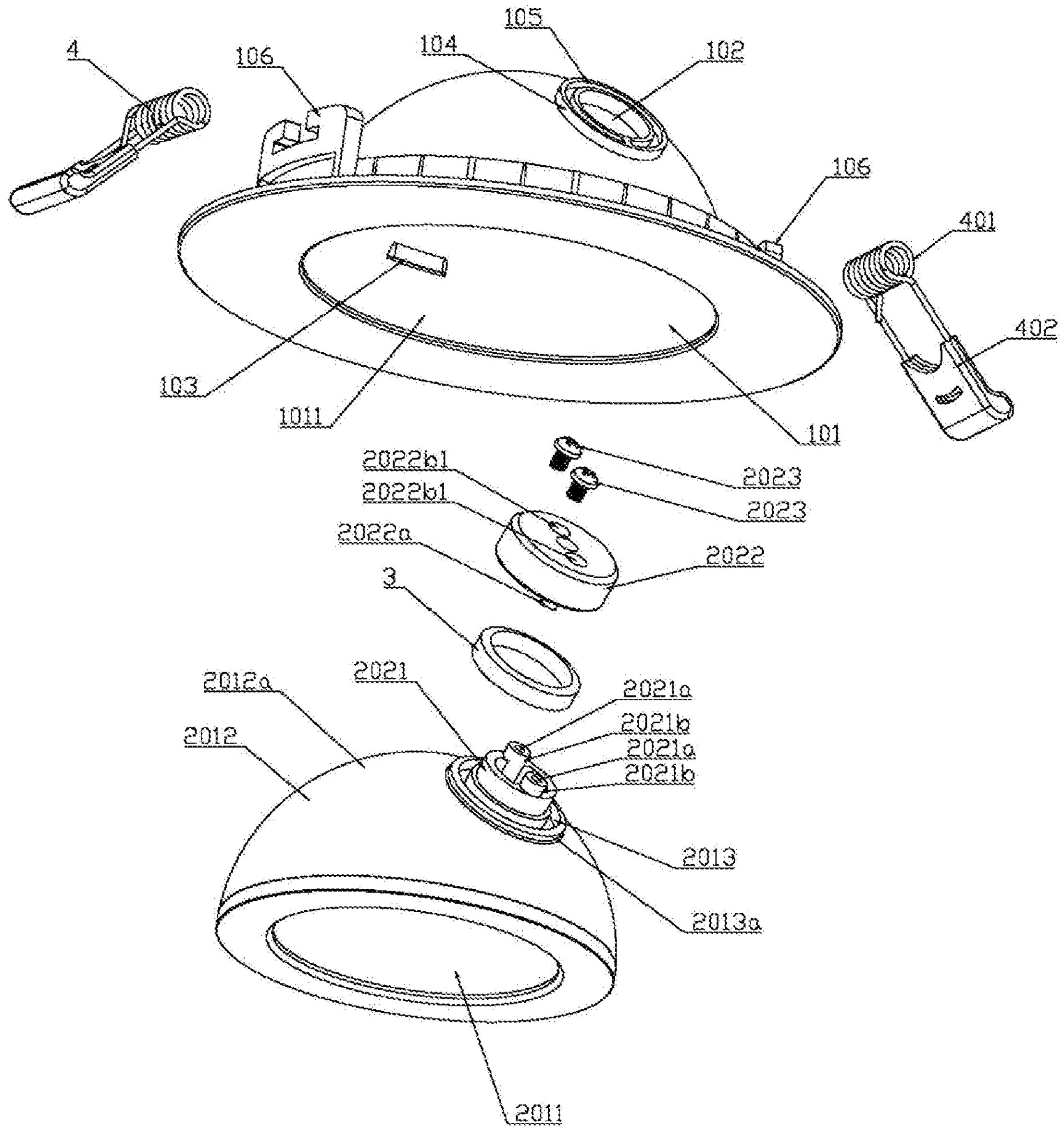
FIG. 2 is a schematic exploded structural view of the angle-adjustable lamp of the present disclosure.
Figure 3:
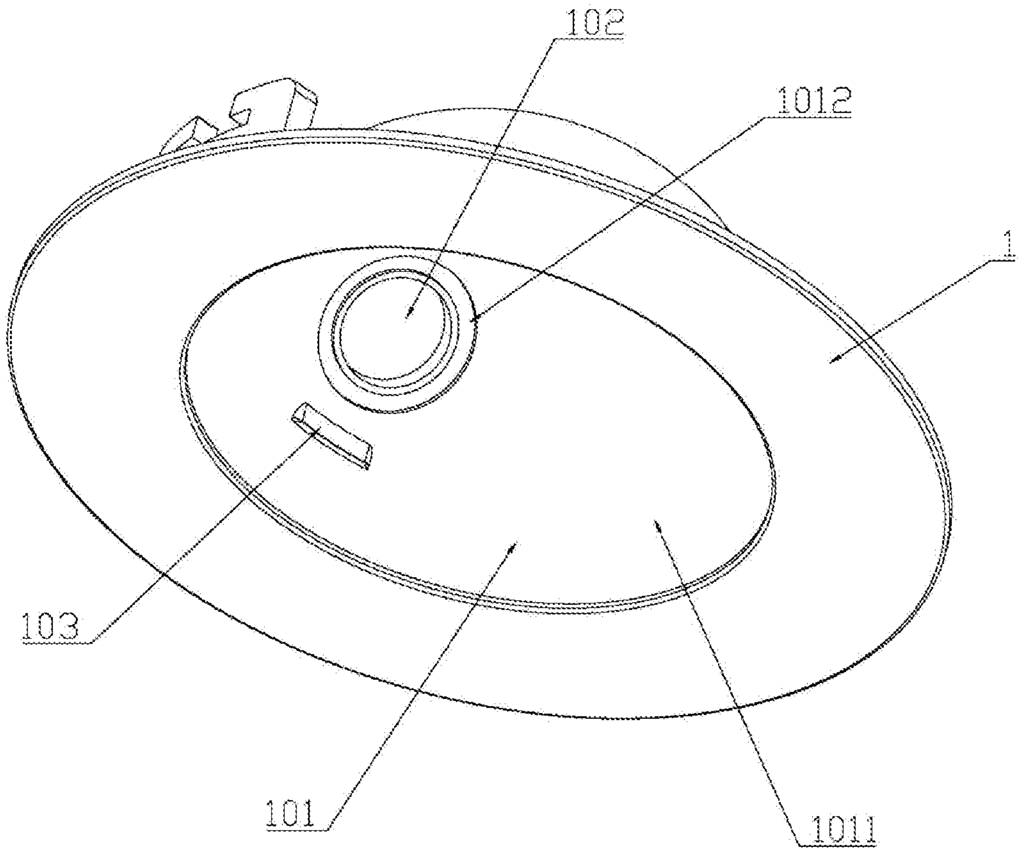
FIG. 3 is a schematic structural view of a base shell in the angle-adjustable lamp of the present disclosure.
Figure 4:
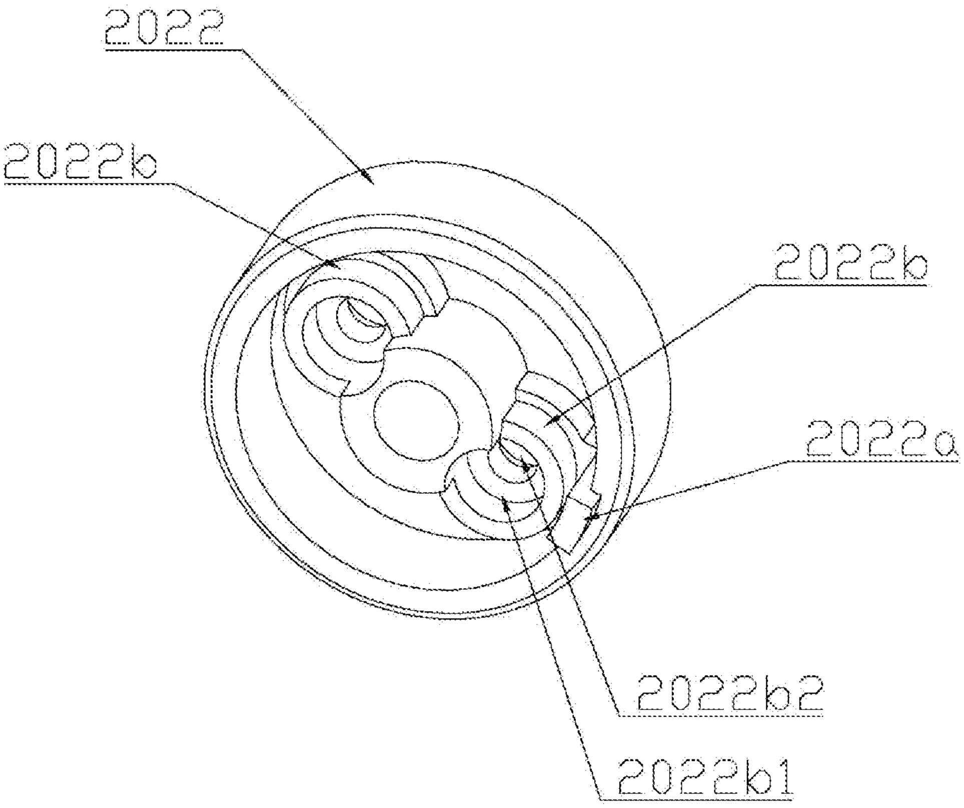
FIG. 4 is a schematic structural view of a rotating shaft cover in the angle-adjustable lamp of the present disclosure.
Figure 5:
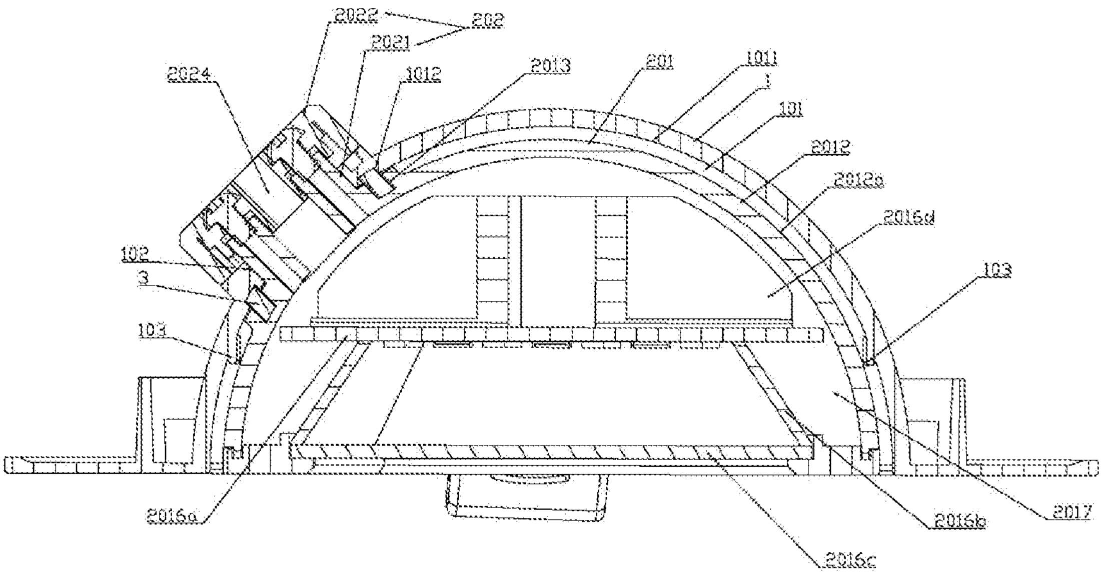
FIG. 5 is a schematic cross-sectional structural view of the angle-adjustable lamp of the present disclosure.
Figure 6:
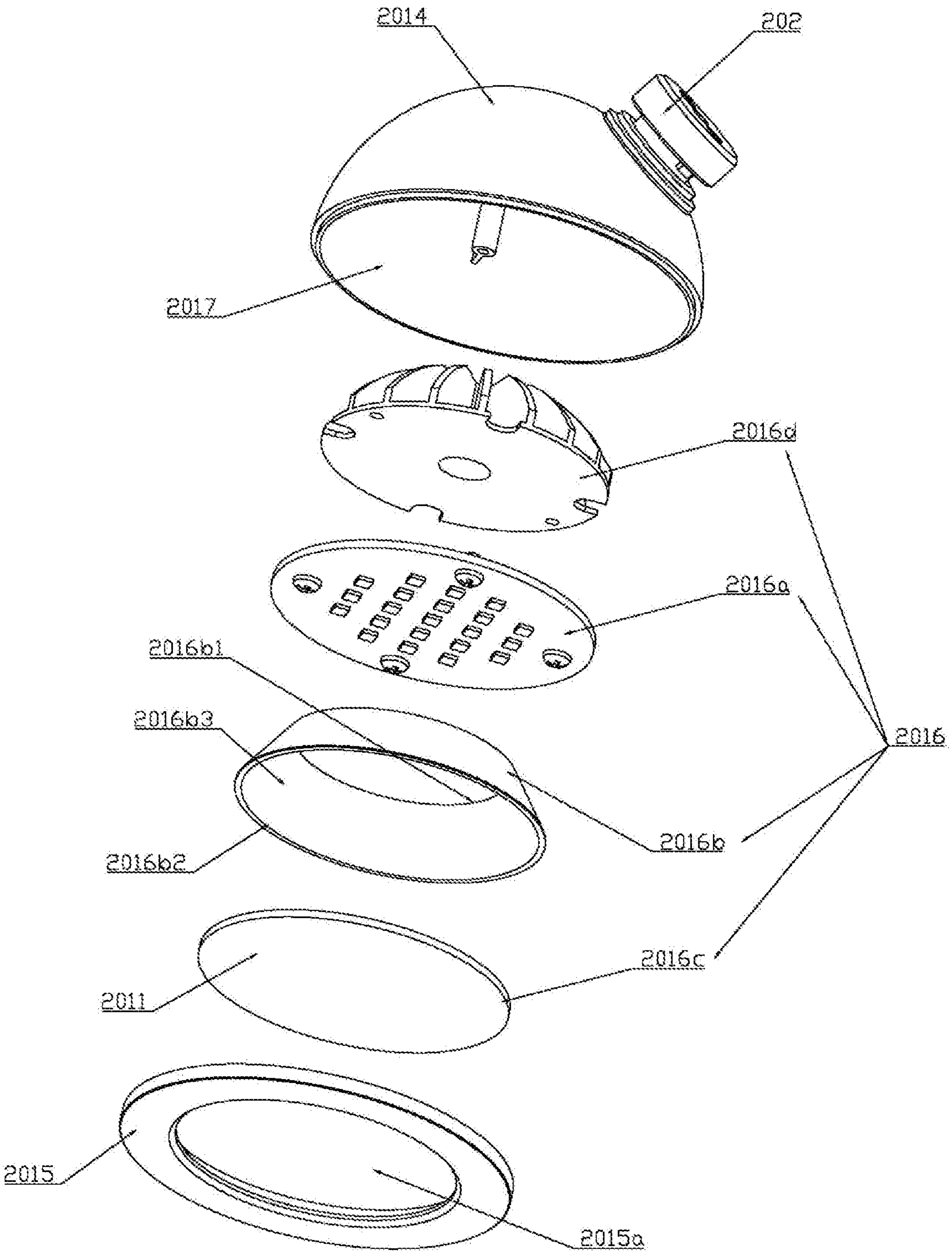
FIG. 6 is a schematic exploded structural view of a lamp body in the angle-adjustable lamp of the present disclosure.

Referring to FIG. 1 to FIG. 6, the present disclosure provides an angle-adjustable lamp, including a base shell 1 and a lamp body 2. The base shell 1 is provided with an accommodating cavity 101 for accommodating the lamp body 2. The lamp body 2 is rotatably mounted in the accommodating cavity 101 and is in a damping fit with the accommodating cavity 101. The lamp body 2 includes a lamp body main body 201 and a rotating shaft 202 having one end connected with the lamp body main body 201. The lamp body main body 201 has a light exit surface 2011 for emitting light. An axis of the rotating shaft 202 is not perpendicular to the light exit surface 2011. An end of the rotating shaft 202 away from the lamp body main body 201 runs through the base shell 1 and extends to an outside of the base shell 1. Specifically, when in use, the lamp body 2 is always in a damping fit with the accommodating cavity 101.

“An axis of the rotating shaft 202 is not perpendicular to the light exit surface 2011” can be understood as: the axis of the rotating shaft 202 is parallel to the light exit surface 2011, or the axis of the rotating shaft 202 is arranged at an angle with the light exit surface 2011 and the angle is smaller than 90 degrees.

With the above structure, the user may rotate the rotating shaft 202 relative to the base shell 1 so as to drive the lamp body main body 201 to rotate around the axis of the rotating shaft 202 therewith. Moreover, since the axis of the rotating shaft 202 is not perpendicular to the light exit surface 2011, the light exit angle of the light exit surface 2011 can be adjusted when the light exit surface rotates around the axis of the rotating shaft 202.

Moreover, the lamp body 2 is in a damping fit with the accommodating cavity 101, so that the lamp body 2 can stay and remain in any position to which it moves. That is, after operating the rotating shaft 202 to adjust the light exit angle of the light exit surface 2011 to a proper position, the user may stop operating the rotating shaft 202. Then, the lamp body 2, which is in a damping fit with the accommodating cavity 101, can stay in this position, so that the light exit surface 2011 can stay at this light exit angle. In addition, due to the damping fit between the lamp body 2 and the accommodating cavity 101, the user needs to overcome the damping force when operating the rotating shaft 202, which increases the operating feel of the user.

With the above structure, the light exit angle of the light exit surface 2011 can be adjusted within a wide range. Moreover, the structure is simple and convenient to operate.

Further, the lamp body main body 201 includes a rotating portion 2012 having a convex spherical curved surface 2012*a*, and correspondingly, an inner wall of the accommodating cavity 101 has a concave spherical curved surface 1011. The rotating portion 2012 of the lamp body main body 201 is rotatably arranged in the accommodating cavity 101. The axis of the rotating shaft 202 or an extension line thereof passes through a center of sphere of the convex spherical curved surface 2012*a*.

With the above structure, the convex spherical curved surface 2012*a* of the rotating portion is fitted with the concave spherical curved surface 1011 of the inner wall of the accommodating cavity 101, so that the lamp body main body 201 can be better rotatably arranged in the accommodating cavity 101. The axis of the rotating shaft 202 or the extension line thereof passes through the center of sphere of the convex spherical curved surface 2012*a*, so that when the rotation of the rotating shaft 202 drives the rotating portion 2012 to rotate, the rotating portion 2012 will not deviate in the radial direction, that is, the distance between the convex spherical curved surface 2012*a* of the rotating portion 2012 and the concave spherical curved surface 1011 of the inner wall of the accommodating cavity 101 will not change. The above structure is reasonable, is reliable and stable in operation, and ensures a wide adjustment range of the light exit angle of the light exit surface 2011.

Further, the angle-adjustable lamp includes a damping member 3 arranged between the inner wall of the accommodating cavity 101 and an outer wall of the lamp body main body 201. A side of the damping member 3 facing the outer wall of the lamp body main body 201 abuts against the outer wall of the lamp body main body 201, and a side facing the inner wall of the accommodating cavity 101 abuts against the inner wall of the accommodating cavity 101.

With the above structure, the arrangement of the damping member 3 realizes the damping fit between the lamp body main body 201 and the accommodating cavity 101.

Further, the damping member 3 is arranged near the rotating shaft 202.

With the above structure, when the rotating shaft 202 drives the lamp body main body 201 to rotate, the damping member 3 can always abut against the lamp body main body 201 and the inner wall of the accommodating cavity 101, thereby ensuring the reliable damping fit between the lamp body main body 201 and the inner wall of the accommodating cavity 101.

Further, a first damping positioning groove 2013 for accommodating and positioning the damping member 3 is concavely provided near a joint of the lamp body main body 201 and the rotating shaft 202. Correspondingly, the accommodating cavity 101 is concavely provided with a second damping positioning groove 1012 for accommodating and positioning the damping member 3 near a rotating shaft hole 102 provided in the base shell 1 that allows the rotating shaft 202 to pass through.

With the above structure, the first damping positioning groove 2013 and the second damping positioning groove 1012 not only performs a positioning function during mounting, but also can prevent the damping member 3 from deviating from the lamp body main body 201 when the lamp body main body 201 rotates relative to the accommodating cavity 101 during use, so that the damping member 3 can always abut against the lamp body main body 201 and the inner wall of the accommodating cavity 101, thereby ensuring the reliable damping fit between the lamp body main body 201 and the inner wall of the accommodating cavity 101.

Further, the damping member 3 is annular, and has an inner diameter greater than or equal to a diameter of the rotating shaft 202. The damping member 3 is sleeved outside the rotating shaft 202.

With the above structure, the structure of the damping member 3 is more reasonable, thereby ensuring the reliable damping fit between the lamp body main body 201 and the inner wall of the accommodating cavity 101.

Further, the outer wall of the lamp body main body 201 is concavely provided with a first damping positioning groove 2013 for accommodating and positioning the damping member 3, and the first damping positioning groove 2013 is annular to be matched with the damping member 3 and is arranged around the rotating shaft 202. Correspondingly, the inner wall of the accommodating cavity 101 is concavely provided with a second damping positioning groove 1012 for accommodating and positioning the damping member 3, and the second damping positioning groove 1012 is annular to be matched with the damping member 3 and is arranged around a rotating shaft hole 102 in the base shell 1 that allows the rotating shaft 202 to pass through.

With the above structure, the first damping positioning groove 2013 and the second damping positioning groove 1012 can adapt to the annular damping member 3, which makes the above structure more reasonable.

Further, a side wall of the first damping positioning groove 2013 extends outward to form an extending groove wall portion 2013*a*.

The first positioning groove is provided in the outer side wall of the lamp body main body 201, specifically, in the outer wall of the lamp body housing 2014 in the lamp body main body 201, and the lamp body housing 2014 is generally not very thick. With the above structure, the extending groove wall portion 2013*a* arranged can increase the depth of the first damping positioning groove 2013, so that the first damping positioning groove 2013 can better position, accommodate and limit the damping member 3.

Moreover, due to the arrangement of the extending groove wall portion 2013*a*, a certain gap is formed between the lamp body main body 201 and the inner wall of the accommodating cavity 101, which can avoid excessive friction between the lamp body main body 201 and the inner wall of the accommodating cavity 101 during rotation, and thus avoid causing damage to the lamp body main body and the inner wall of the accommodating cavity. The above structure is reasonable in arrangement and can prolong the service life of the angle-adjustable lamp.

Further, the inner wall of the accommodating cavity 101 is convexly provided with a stabilizing block 103, and the stabilizing block 103 is in a contact fit or a clearance fit with the outer wall of the lamp body main body 201.

Due to the gap between the lamp body main body 201 and the inner wall of the accommodating cavity 101, the lamp body main body 201 may shake when rotating. With the above structure, the stabilizing block 103 arranged can limit the lamp body main body 201 to some extent, which can avoid shaking or reduce the degree of shaking when the lamp body main body 201 rotates, so as to stabilize the rotation of the lamp body main body 201.

Further, along a longitude line of the inner wall of the accommodating cavity 101 and in a direction facing an opening of the accommodating cavity 101, the stabilizing block 103 is arranged gradually close to the outer wall of the lamp body main body 201, and an end of the stabilizing block 103 facing the opening of the accommodating cavity 101 is in a contact fit or a clearance fit with the outer wall of the lamp body main body 201.

With the above structure, the structure of the stabilizing block 103 is more reasonable and reliable in arrangement, and can minimize the influence on the rotation of the lamp body main body 201.

Further, multiple stabilizing blocks 103 are provided, and the multiple stabilizing blocks 103 are located on a same latitude line on the inner wall of the accommodating cavity 101 and equally divide the inner wall of the accommodating cavity 101 along a circumferential direction.

With the above structure, the stabilizing block 103 is more reasonable in arrangement, and the multiple stabilizing blocks 103 arranged can better stabilize the rotation of the lamp body main body 201. Specifically, two stabilizing blocks 103 are arranged, and the two stabilizing blocks 103 are symmetrically arranged on two sides of the inner wall of the accommodating cavity 101.

Further, the rotating shaft 202 includes a rotating shaft body 2021 and a rotating shaft cover 2022. One end of the rotating shaft body 2021 is connected with the lamp body main body 201, and an other end runs through the accommodating cavity 101 and extends to the outside of the base shell 1. The rotating shaft cover 2022 is arranged on an end of the rotating shaft 202 extending to an outer wall of the base shell 1, and an outer diameter of the rotating shaft cover 2022 is greater than a diameter of the rotating shaft hole 102 in the accommodating cavity 101 that allows the rotating shaft 202 to pass through.

With the above structure, the structure of the rotating shaft 202 is more reasonable and convenient to mount. Specifically, the end of the rotating shaft body 2021 away from the lamp body main body 201 extends from the inside of the accommodating cavity 101 to the outside of the base shell 1 through the rotating shaft hole 102 provided in the base shell 1 that allows the rotating shaft 202 to pass through, and then is connected with the rotating shaft cover 2022. Since the outer diameter of the rotating shaft cover 2022 is greater than the diameter of the rotating shaft hole 102, with the limit of the rotating shaft cover 2022 and the lamp body main body 201, the movement of the rotating shaft body in the axial direction is limited, thereby realizing mounting.

Further, the outer wall of the base shell 1 is convexly provided with an abutting portion 104 outside the rotating shaft hole 102 in the base shell 1 that allows the rotating shaft 202 to pass through, and a side of the rotating shaft cover 2022 facing the outer wall of the base shell 1 is in a contact fit with a side of the abutting portion 104 of the base shell 1 facing the rotating shaft cover 2022.

With the above structure, the structure of the angle-adjustable lamp is more reasonable. Moreover, since the side of the abutting portion 104 facing the rotating shaft cover 2022 is a flat surface, the rotating shaft 202 can rotate more stably.

Further, the side of the rotating shaft cover 2022 facing the base shell 1 is convexly provided with a guide block 2022*a*, and the guide block 2022*a* is arranged at a distance from an axis of the rotating shaft cover 2022. A side of the base shell 1 facing the rotating shaft cover 2022 is provided with a guide groove 105 matched with the guide block 2022*a*, and the guide groove 105 is matched with a moving track of the guide block 2022*a*.

The rotation of the rotating shaft cover 2022 can drive the rotating shaft body to rotate 2021, thereby driving the lamp body main body 201 to rotate. Therefore, with the above structure, the guide block 2022*a* is fitted with the guide groove 105, so that the rotating shaft cover 2022 can rotate more stably and reliably, and the rotating shaft body 2021 and the lamp body main body 201 can also rotate more stably and reliably. Specifically, the guide groove 105 is arranged in the abutting portion 104.

Further, a limit block configured to abut against a side surface of the guide block 2022*a* is arranged in the guide groove 105, and in a case that the guide block 2022*a* moves forward along the guide groove 105 to abut against the limit block or the guide block 2022*a* moves backward along the guide groove 105 to abut against the limit block, the light exit surface 2011 of the lamp body main body 201 is parallel to a plane where the opening of the accommodating cavity 101 is located.

With the above structure, the limit block limits the movement of the guide block 2022*a* in the guide groove 105, so that the forward and backward movement range of the guide block 2022*a* is limited, that is, the rotation angle of the rotating shaft 202 is limited, thereby limiting the rotation angle of the lamp body main body 201.

In the case that the guide block 2022*a* moves forward along the guide groove 105 to abut against the limit block or the guide block 2022*a* moves backward along the guide groove 105 to abut against the limit block, the light exit surface 2011 of the lamp body main body 201 is parallel to the plane where the opening of the accommodating cavity 101 is located, so that the user can adjust the light exit surface 2011 of the lamp body main body 201 to be parallel to the opening of the accommodating cavity 101 more conveniently, which facilitates the user.

Further, the lamp body main body 201 includes a lamp body housing 2014, a lamp body housing cover 2015 and a light source assembly 2016. The lamp body housing 2014 and the lamp body housing cover 2015 are combined to form a light source mounting cavity 2017 for accommodating and mounting the light source assembly 2016. The rotating shaft body 2021 is connected with the lamp body housing 2014, and the rotating shaft body 2021 and the lamp body housing 2014 are an integrated piece.

With the above structure, the rotating shaft body 2021 and the lamp body housing 2014 are an integrated piece, so that the structure of the rotating shaft body 2021 and the lamp body housing 2014 is more reasonable in arrangement, which facilitates production and reduces mounting steps. Moreover, the above structure can effectively prevent the relative rotation between the rotating shaft body 2021 and the lamp body housing 2014, thereby ensuring the rotating shaft body 2021 to drive the lamp body housing 2014 to rotate synchronously.

Further, a peripheral side wall of the rotating shaft body 2021 is a cylindrical side wall.

Since the rotating shaft body 2021 and the lamp body housing 2014 are an integrated piece, the peripheral side wall of the rotating shaft body 2021 can be a cylindrical side wall, that is, the periphery of the cross section of the rotating shaft body 2021 is circular. With the above structure, the rotating shaft body 2021 can be better fitted with the rotating shaft hole 102 in the base shell 1 that allows the rotating shaft 202 to pass through, so that the rotating shaft body 2021 can rotate more stably, that is, the lamp body 2 main body can rotate more stably.

Further, the rotating shaft body 2021 and the rotating shaft cover 2022 are fixedly connected through a fastener 2023.

With the above structure, the rotating shaft body 2021 can be fixedly connected with the rotating shaft cover 2022. Specifically, the fastener 2023 is a screw.

Further, the rotating shaft body 2021 is provided with a fastening hole 2021*a* in a fastening fit with the fastener 2023. The fastening hole 2021*a* extends along an axis of the rotating shaft body 2021, and a side wall on an end of the fastening hole 2021*a* away from the lamp body main body 201 protrudes to form an insertion protrusion 2021*b*. Correspondingly, a side of the rotating shaft cover 2022 facing the rotating shaft body 2021 is provided with an insertion fit post 2022*b*, and the insertion fit post is concavely provided with an insertion groove 2022*b*1 insertable by the insertion protrusion 2021*b*. A bottom surface of the insertion groove 2022*b*1 is provided with a fastening through hole 2022*b*2 running through the rotating shaft cover 2022 so as to allow the fastener to pass through 2023.

With the above structure, the insertion protrusion 2021*b* is fitted with the insertion groove 2022*b*1, so that the rotating shaft cover 2022 can be positioned and mounted on the rotating shaft body 2021 conveniently. The fastener 2023 passes through the fastening through hole 2022*b*2 and is in a fastening fit with the fastening hole 2021*a*. Specifically, the fastener 2023 is a screw, and the fastener 2023 and the fastening hole 2021*a* are in a threaded fastening fit.

The side of the rotating shaft cover 2022 facing the base shell 1 is recessed inward to form a rotating shaft cover 2022 groove, and the insertion fit post 2022*b* is arranged on a bottom surface of the rotating shaft cover 2022 groove.

Further, multiple fastening holes 2021*a* that are arranged around the axis of the rotating shaft body 2021 are provided. Correspondingly, the rotating shaft cover 2022 is provided with a same number of the insertion fit posts 2022*b* as the fastening holes 2021*a* that are arranged in one-to-one correspondence to the fastening holes 2021*a*.

With the above structure, the rotating shaft cover 2022 and the rotating shaft body 2021 can be connected more stably and reliably.

Further, the lamp body main body 201 includes a lamp body housing 2014, a lamp body housing cover 2015 and a light source assembly 2016. The lamp body housing 2014 and the lamp body housing cover 2015 are combined to form a light source mounting cavity 2017 for accommodating and mounting the light source assembly 2016. The lamp body housing cover 2015 is provided with a light exit opening 2015*a*. The light source assembly 2016 has the light exit surface 2011, and the light exit surface 2011 faces the light exit opening 2015*a*.

With the above structure, the structure of the lamp body main body 201 is more reasonable, and facilitates the assembly of the lamp body main body 201.

Further, the rotating shaft 202 is provided with a wiring through hole 2024 running through the rotating shaft along the axis.

With the above structure, wires can enter the light source mounting cavity 2017 through the wiring through hole and be connected with the light source assembly 2016. Moreover, the wiring through hole 2024 is provided in a reasonable position, which can prevent the wires from intertwining and ensure a stable and reliable connection between the wires and the light source assembly 2016 when the lamp body main body 201 rotates.

Further, the light source assembly 2016 includes a light source body 2016*a*, a reflective cup 2016*b* and a diffusing plate 2016*c*. A light emitting side of the light source body 2016*a* faces the light exit opening 2015*a*. The reflective cup 2016*b* has a light entrance port 2016*b*1 and a light exit port

**2016*b*2, and an inner wall of the reflective cup 2016*b* connected between the light entrance port 2016*b*1 and the light exit port 2016*b*2 forms a reflective surface 2016*b*3. The light entrance port 2016*b*1 of the reflective cup 2016*b* faces the light emitting side of the light source body 2016*a*, and the light exit port 2016*b*2 faces the light exit opening 2015*a*. The diffusing plate 2016*c* is arranged between the light exit port 2016*b*2 of the reflective cup 2016*b* and the light exit opening 2015*a* to form the light exit surface 2011**.

With the above structure, the structure of the light source assembly 2016 is more reasonable in arrangement. Light is emitted by the light source body **2016*a* and enters the reflective cup 2016*b* through the light entrance port 2016*b*1 of the reflective cup 2016*b*. Since the reflective surface 2016*b*3 is arranged on the inner wall of the reflective cup 2016*b*, light can be more intensive and exit from the side of the light exit port 2016*b*2 of the reflective cup 2016*b*. The diffusing plate 2016*c* arranged at the light exit opening 2015*a*** can convert a point or line light source into a soft and uniform surface light source.

Specifically, the light source body **2016*a*** is a lamp board provided with multiple LED light beads.

Further, the light source assembly 2016 further includes a heat dissipation assembly **2016*d* configured to dissipate heat for the light source body 2016*a***.

With the above structure, the heat dissipation assembly **2016*d* can dissipate heat for the light source body 2016*a*, thereby ensuring the light source body 2016*a*** to operate stably and reliably.

Specifically, the heat dissipation assembly **2016*d* is a heat dissipation structure based on heat conduction by metals, that is, the heat is dissipated passively. With the above structure, the heat dissipation assembly 2016*d*** has no noise generated during the heat dissipation process, and is reasonable in design.

Further, two sides of the base shell 1 are provided with torsion spring clips 4 configured to fix the angle-adjustable lamp. Correspondingly, the base shell 1 is provided with clip seats 106 configured to mount the torsion spring clips 4.

With the above structure, due to the arrangement of the torsion spring clips 4, the angle-adjustable lamp can be mounted and fixed more quickly and conveniently.

Further, the torsion spring clip 4 includes a torsion spring 401 arranged on the base shell 1 and a clip sleeve 402 sleeved over the torsion spring 401. Specifically, the torsion spring 401 is arranged on the clip seat 106.

With the above structure, due to the arrangement of the clip sleeves 402, forces can be better applied to the torsion spring clips 4, thereby ensuring the angle-adjustable lamp to be mounted and fixed stably and reliably.

For the same or similar parts between the embodiments in the specification, reference may be made to each other. Each embodiment focuses on differences from other embodiments.

The foregoing descriptions are merely specific implementations of this application, but the protection scope of this application is not limited thereto. Any variation or replacement readily figured out by those skilled in the art within the technical scope disclosed in this application shall fall within the protection scope of this application. Therefore, the protection scope of this application shall be subject to the protection scope of the claims.

What is claimed is:

1. An angle-adjustable lamp, comprising:
- a base shell; and
- a lamp body, wherein:
  - the base shell is provided with an accommodating cavity for accommodating the lamp body,
  - the lamp body is rotatably mounted in the accommodating cavity and is in a damping fit with the accommodating cavity, and
  - the lamp body comprises:
    - a lamp body main body, and
    - a rotating shaft having one end connected with the lamp body main body, wherein:
      - the lamp body main body includes a light exit surface for emitting light, an axis of the rotating shaft being not perpendicular to the light exit surface, and an end of the rotating shaft away from the lamp body main body running through the base shell and extending to an outside of the base shell, and
      - the rotating shaft includes a rotating shaft cover extending to an outer wall of the base shell, a side of the rotating shaft cover facing the base shell being convexly provided with a guide block, the guide block being arranged at a distance from an axis of the rotating shaft cover, a side of the base shell facing the rotating shaft cover being provided with a guide groove matched with a moving track of the guide block, and a limit block being configured to abut against a side surface of the guide block being arranged in the guide groove, wherein:
        - when the guide block abuts against the limit block, the light exit surface of the lamp body main body is parallel to a plane where an opening of the accommodating cavity is located.

2. The angle-adjustable lamp according to claim 1, wherein:
- the lamp body main body comprises a rotating portion having a convex spherical curved surface, and correspondingly, an inner wall of the accommodating cavity has a concave spherical curved surface;
- the rotating portion of the lamp body main body is rotatably arranged in the accommodating cavity; and
- the axis of the rotating shaft or an extension line thereof passes through a center of sphere of the convex spherical curved surface.

3. The angle-adjustable lamp according to claim 2, comprising a damping member arranged between the inner wall of the accommodating cavity and an outer wall of the lamp body main body, wherein a side of the damping member facing the outer wall of the lamp body main body abuts against the outer wall of the lamp body main body, and a side facing the inner wall of the accommodating cavity abuts against the inner wall of the accommodating cavity.

4. The angle-adjustable lamp according to claim 3, wherein:
- the damping member is arranged near the rotating shaft;
- a first damping positioning groove for accommodating and positioning the damping member is concavely provided near a joint of the lamp body main body and the rotating shaft; and
- correspondingly, the accommodating cavity is concavely provided with a second damping positioning groove for accommodating and positioning the damping member near a rotating shaft hole provided in the base shell that allows the rotating shaft to pass through.

5. The angle-adjustable lamp according to claim 4, wherein:

a side wall of the first damping positioning groove extends outward to form an extending groove wall portion;

the inner wall of the accommodating cavity is convexly provided with a stabilizing block, and the stabilizing block is in a contact fit or a clearance fit with the outer wall of the lamp body main body;

along a longitude line of the inner wall of the accommodating cavity and in a direction facing an opening of the accommodating cavity, the stabilizing block is arranged gradually close to the outer wall of the lamp body main body, and an end of the stabilizing block facing the opening of the accommodating cavity is in a contact fit or a clearance fit with the outer wall of the lamp body main body; and a plurality of stabilizing blocks are provided, and the plurality of stabilizing blocks are located on a same latitude line on the inner wall of the accommodating cavity and equally divide the inner wall of the accommodating cavity along a circumferential direction.

6. The angle-adjustable lamp according to claim 3, wherein:

the damping member is annular, and has an inner diameter greater than or equal to a diameter of the rotating shaft;

the damping member is sleeved outside the rotating shaft;

the outer wall of the lamp body main body is concavely provided with a first damping positioning groove for accommodating and positioning the damping member, and the first damping positioning groove is annular to be matched with the damping member and is arranged around the rotating shaft; and correspondingly, the inner wall of the accommodating cavity is concavely provided with a second damping positioning groove for accommodating and positioning the damping member, and the second damping positioning groove is annular to be matched with the damping member and is arranged around a rotating shaft hole in the base shell that allows the rotating shaft to pass through.

7. The angle-adjustable lamp according to claim 6, wherein:

a side wall of the first damping positioning groove extends outward to form an extending groove wall portion;

the inner wall of the accommodating cavity is convexly provided with a stabilizing block, and the stabilizing block is in a contact fit or a clearance fit with the outer wall of the lamp body main body;

along a longitude line of the inner wall of the accommodating cavity and in a direction facing an opening of the accommodating cavity, the stabilizing block is arranged gradually close to the outer wall of the lamp body main body, and an end of the stabilizing block facing the opening of the accommodating cavity is in a contact fit or a clearance fit with the outer wall of the lamp body main body; and a plurality of stabilizing blocks are provided, and the plurality of stabilizing blocks are located on a same latitude line on the inner wall of the accommodating cavity and equally divide the inner wall of the accommodating cavity along a circumferential direction.

8. The angle-adjustable lamp according to claim 3, wherein:

the rotating shaft comprises a rotating shaft body, one end of the rotating shaft body being connected with the lamp body main body, and another end running through the accommodating cavity and extending to outside of the base shell, an outer diameter of the rotating shaft cover is greater than a diameter of a rotating shaft hole in the accommodating cavity that allows the rotating shaft to pass through, and the outer wall of the base shell is convexly provided with an abutting portion outside the rotating shaft hole in the base shell that allows the rotating shaft to pass through, and a side of the rotating shaft cover facing the outer wall of the base shell is in a contact fit with a side of the abutting portion of the base shell facing the rotating shaft cover.

9. The angle-adjustable lamp according to claim 8, wherein:

the lamp body main body comprises a lamp body housing, a lamp body housing cover and a light source assembly;

the lamp body housing and the lamp body housing are combined to form a light source mounting cavity for accommodating and mounting the light source assembly;

the rotating shaft body is connected with the lamp body housing, and the rotating shaft body and the lamp body housing are an integrated piece;

a peripheral side wall of the rotating shaft body is a cylindrical side wall;

the rotating shaft body and the rotating shaft cover are fixedly connected through a fastener;

the rotating shaft body is provided with a fastening hole in a fastening fit with the fastener, the fastening hole extending along an axis of the rotating shaft body, and a side wall on an end of the fastening hole away from the lamp body main body protruding to form an insertion protrusion;

correspondingly, a side of the rotating shaft cover facing the rotating shaft body is provided with an insertion fit post, and the insertion fit post is concavely provided with an insertion groove insertable by the insertion protrusion;

a bottom surface of the insertion groove is provided with a fastening through hole running through the rotating shaft cover so as to allow the fastener to pass through;

a plurality of fastening holes that are arranged around the axis of the rotating shaft body are provided; and correspondingly, the rotating shaft cover is provided with a same number of insertion fit posts as fastening holes arranged in one-to-one correspondence.

10. The angle-adjustable lamp according to claim 1, wherein:

the lamp body main body comprises a lamp body housing, a lamp body housing cover and a light source assembly;

the lamp body housing and the lamp body housing cover are combined to form a light source mounting cavity for accommodating and mounting the light source assembly;

the lamp body housing cover is provided with a light exit opening;

the light source assembly has the light exit surface, and the light exit surface faces the light exit opening;

the rotating shaft is provided with a wiring through hole running through the rotating shaft along the axis;

the light source assembly comprises a light source body, a reflective cup and a diffusing plate;

a light emitting side of the light source body faces the light exit opening;

the reflective cup has a light entrance port and a light exit port, and an inner wall of the reflective cup connected between the light entrance port and the light exit port forms a reflective surface;

the light entrance port of the reflective cup faces the light emitting side of the light source body, and the light exit port faces the light exit opening;

the diffusing plate is arranged between the light exit port of the reflective cup and the light exit opening to form the light exit surface;

the light source assembly further comprises a heat dissipation assembly configured to dissipate heat for the light source body; the heat dissipation assembly is a heat dissipation structure based on heat conduction by metals;

two sides of the base shell are provided with torsion spring clips configured to fix the angle-adjustable lamp; correspondingly, the base shell is provided with clip seats configured to mount the torsion spring clips; and the torsion spring clips comprising a torsion spring arranged on the base shell and a clip sleeve sleeved over the torsion spring.

* * * * *